United States Patent
Dempster

(10) Patent No.: US 10,968,101 B2
(45) Date of Patent: Apr. 6, 2021

(54) OZONE CELL POWER SUPPLY APPARATUS AND METHOD

(71) Applicant: Pacific Ozone Technology, Inc., Benicia, CA (US)

(72) Inventor: Philip Tinsley Dempster, Concord, CA (US)

(73) Assignee: Pacific Ozone Technology Inc, Benicia, CA (US)

( * ) Notice: Subject to any disclaimer, the term of this patent is extended or adjusted under 35 U.S.C. 154(b) by 198 days.

(21) Appl. No.: 16/058,982

(22) Filed: Aug. 8, 2018

(65) Prior Publication Data

US 2018/0346331 A1  Dec. 6, 2018

Related U.S. Application Data

(60) Division of application No. 14/849,659, filed on Sep. 10, 2015, now abandoned, which is a continuation of application No. 13/935,353, filed on Jul. 3, 2013, now abandoned.

(60) Provisional application No. 61/668,667, filed on Jul. 6, 2012.

(51) Int. Cl.
*C01B 13/11* (2006.01)

(52) U.S. Cl.
CPC ............ *C01B 13/115* (2013.01); *C01B 13/11* (2013.01); *C01B 2201/10* (2013.01); *C01B 2201/30* (2013.01); *C01B 2201/90* (2013.01)

(58) Field of Classification Search
None
See application file for complete search history.

(56) References Cited

U.S. PATENT DOCUMENTS

| | | | |
|---|---|---|---|
| 4,051,045 A | 9/1977 | Yamamoto et al. | |
| 6,451,267 B1* | 9/2002 | Ayad | C01B 13/115 363/136 |
| 2007/0108040 A1 | 5/2007 | Elkin et al. | |
| 2013/0257311 A1 | 10/2013 | Tran et al. | |

FOREIGN PATENT DOCUMENTS

JP   5193086   5/2013

* cited by examiner

*Primary Examiner* — Kishor Mayekar

(57) ABSTRACT

The present invention generally includes an ozone generation system with a power supply that measures the rate of energy delivered to the ozone generation cell. While changing voltage, frequency or current will likely affect the rate of energy delivery, current, frequency and voltage provide a very poor and unreliable control for an ozone generation cell. It is only through control of the rate of energy delivery that consistent, reliable ozone generation is possible. Based upon the measurements of the rate of energy delivery as measured at the ozone generation cell, compared to the rate of energy delivery supplied, the rate of energy delivery supplied can be adjusted to improve ozone production and control.

5 Claims, 2 Drawing Sheets

OZONE CELL POWER SUPPLY APPARATUS AND METHOD

CROSS-REFERENCE TO RELATED APPLICATIONS

This patent application is a divisional of U.S. patent application Ser. No. 14/849,659, filed Sep. 10, 2015, which is a divisional of U.S. patent application Ser. No. 13/935,353, filed Jul. 3, 2013, which claims the benefit of U.S. Provisional Patent Application No. 61/668,667, filed Jul. 6, 2012, which are incorporated by reference along with all other references cited in this application.

BACKGROUND OF THE INVENTION

This invention relates to an ozone generation system and a method for generating ozone.

Ozone is widely used to cleanse/purify water and to cleanse/purify foods. Ozone generators are used in food packaging plants where ozone treated water is sprayed onto food moving down an assembly line so that any bacteria on the food is removed. Additionally, ozone treated water may be used in restaurants to clean dishes as well as to cleanse employees hands.

One of the problems with ozone generation is actually generating the ozone itself. One ozone generation method is the corona discharge cell. A corona discharge cell generally comprises two electrodes having a dielectric material sandwiched therebetween. Additionally, a space is present between the two electrodes. Specifically, when generating ozone, oxygen gas is passed into a space between two electrodes that are spaced apart by a dielectric material. The ozone is generated in the space. At lower power levels delivered to the cell, the amount of ozone generated tends to be low, but the efficiency of converting the oxygen to ozone tends to be good. Conversely, at higher power levels, the amount of ozone generated is higher than at low power, but the efficiency of converting the oxygen to ozone tends to be less than at the lower power. Electrically controlling generation of ozone has proved a challenge because the load presented by the cell is somewhat unstable, dependent on temperature, dependent on pressure, and even dependent on recent history of cell use. In addition, such cells rely on AC power, and power factor itself is subject to considerable variation depending on conditions. Attempts to control the generation of ozone by variation of voltage, current, or even frequency do not generally result in stable power or production of ozone. It is clear that there is a correlation between parameters such as voltage, current, frequency and ozone generated, but results are not adequately consistent or predictable. Varying voltage, current and/or frequency has worked very well with ordinary electrical loads, but not with ozone generation cells.

What happens when varying voltage, current and/or frequency is that, an unknown quantity of ozone is generated. There are a number of ozone applications that require the precise dosing of ozone. Precise dosing of ozone requires that the ozone reactor cell power supply output vary in a precise and repeatable way in response to a high-resolution input control such as from a PLC.

A typical application requiring precise dosing is the disinfection and sanitization of bottled water. Some natural water sources contain bromide ion, which when oxidized, will form a potentially carcinogenic byproduct known as bromate which is currently a regulated contaminant. Bottled water producers must precisely control their ozone dosing--there is a fine line between not getting enough ozone for the disinfection and sanitization requirements and getting too much ozone that may form bromate. The precision variable and repeatable power supply is thus mandatory for water disinfection and sanitization, as well as many other industrial applications in water treatment, beverage, food and thousands of other industrial processes requiring disinfection, oxidation and sanitization.

Therefore, there is a need in the art for generating ozone at a rate that is predictable, repeatable, and stable.

BRIEF SUMMARY OF THE INVENTION

The present invention generally includes an ozone generation system with a power supply that precisely regulates the rate at which electrical energy is delivered to an ozone generation cell, regardless of how voltage, current, and frequency may be required to vary in order to maintain the constant rate of energy delivery. Because of the generally inconsistent electrical characteristics of the ozone generating cell, control of voltage, frequency or current by itself proves a very poor and unreliable method of control. It is only by controlling the rate of energy delivery that consistent, reliable ozone generation is possible. Based on the measurements of the rate of energy delivery to the ozone cell, or else on measurements of quantities closely correlated to the rate of energy delivery, the power supply can be made to adjust its internal parameters in a fashion that holds the rate of energy delivery constant.

In one embodiment, an ozone generation system comprises an ozone generation cell; a power supply having a variable output parameter; a device that measures rate of energy delivery to the ozone generation cell; an input setting device; and a feedback loop controlling the variable output parameter of the power supply such that rate of energy delivery to the ozone generation cell tends to the setting of the input device, regardless of what combinations of voltage, frequency, and current may be required to achieve this.

In another embodiment, an ozone generation system comprises an ozone generation cell with series inductance; one or more switching devices such as MOSFETS or IGBTs coupled to the ozone generation cell; a device that measures the rate of energy delivery to the cell that is coupled to the one or more switching devices; a DC power supply coupled to the one or more switching devices; a voltage controlled oscillator coupled to the one or more switching devices; an integrator coupled to the voltage controlled oscillator; and an adder coupled to the power measurement device and the integrator.

In another embodiment, an ozone generation system comprises an ozone generation cell; a step-up transformer; a current transformer coupled to the primary or the secondary of the step-up transformer; a switching device, coupled to the current transformer; a voltage controlled oscillator coupled to the switching device driver; an adder coupled to the voltage controller oscillator; and a flip flop coupled to the comparator and the adder.

In another embodiment, a method of generating ozone comprises delivering power to an ozone generating cell; measuring the power applied to the ozone generating cell; and adjusting the power applied to the ozone generation cell.

Other objects, features, and advantages of the present invention will become apparent upon consideration of the following detailed description and the accompanying drawings, in which like reference designations represent like features throughout the figures.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION OF THE INVENTION

Figure 1:
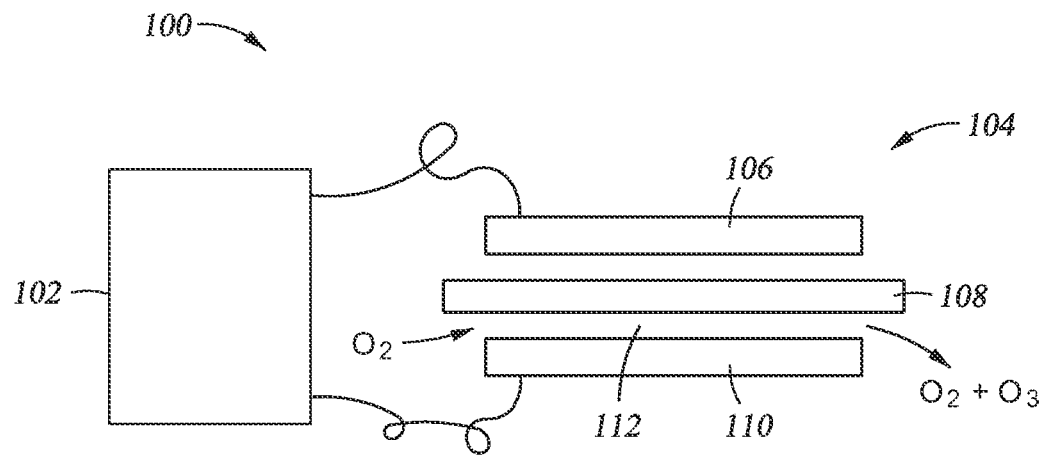
FIG. 1 is a schematic illustration of an ozone generation system according to one embodiment.

The present invention generally includes an ozone generation system with a power supply that measures the rate at which electrical energy is delivered to the ozone generation cell. While changing voltage, frequency or current will likely affect the rate of energy delivery, they do not determine the rate of energy delivery due to the variable and unstable nature of the load, including both variable impedance and variable power factor. It is only through precise control of rate of energy delivery that consistent, reliable ozone generation is possible. By measuring the rate of energy delivery to the ozone cell, comparing the rate of energy delivery to a set point, and using the difference to vary some parameter of the power supply, the rate of energy delivery may be held constant, even though, depending on conditions, that constant rate of energy delivery may require a variety of interacting combinations of voltage, current, and frequency. Based upon the measurements of the rate of energy delivery to the ozone cell compared to the desired setting, the rate of energy delivery can be adjusted by varying some parameter such as voltage, frequency, or current.

Controlling the rate of energy delivery directly has not been used previously because, in the case of an ozone cell, it requires taking into account three interrelated parameters, voltage, frequency, and current, due to inconsistent power factor, impedance and interdependence of voltage, frequency and current. Voltage, frequency, and current cannot be controlled independently, and thus, controlling the rate of energy delivery may be complex. Because of these difficulties, attempts have been made to create adaptable power supplies. Such a power supply may require, for example, some prior adjustment of frequency depending on expected pressure in the cell. Such "adaptable" power supplies cannot be considered fully adaptable, because they must be adjusted for specific conditions. There has been no single, organizing principle identified to date. The present invention is fully adaptable to a broad range of cell characteristics and conditions of use due to use of a single unifying principle. As cell characteristics change, the power supply promptly and reliably adjusts to a voltage, current, and frequency such that the rate of energy delivery, irrespective of the nature of the load, will be held to the desired value.

A corona discharge ozone ($O_3$) cell (cell), comprising a space between electrodes with a dielectric barrier in between cannot pass DC current as a result of the insulating properties of the dielectric barrier. Even though unable to pass DC current, such a cell is capable of passing AC current by capacitive coupling across the ceramic barrier and the space between the electrodes. In application, the space will be filled with flowing oxygen ($O_2$) or other flowing gas containing $O_2$ (feed gas). When the voltage gradient across the gap becomes sufficiently large, ionization of the oxygen molecules within the feed gas occurs, and some $O_2$ atoms will recombine into $O_3$.

A power supply designed to work in combination with such a cell provides the required energy in the form of an AC power source for this application. Such a power source or power supply may define voltage, current, or frequency, independent of the load presented by the cell due to variables of the flowing gas and component part parameters. There is an interaction of these parameters with the capacitive and reactive electrical load constrained by physical law. One cannot independently control both voltage and current. Under any fixed condition of voltage, current will vary with frequency in an electrical discharge cell, or under any fixed condition of current, voltage will vary with frequency. One cannot independently control all of these parameters.

In this application, the possible combinations of voltage, current, and frequency depend on the parameters of the cell itself. In practical application, a cell presents a highly variable load to a power supply. The electrical characteristics of the cell, besides depending on physical dimensions and spacing of its component parts, also depends on temperature of the various components of the cell, pressure of the feed gas, composition of the feed gas, flow rate of the feed gas, and recent activity of the cell.

As a consequence, setting of the parameters of a power supply to create repeatable conditions for production of a predictable rate of ozone production has historically been dependent on the conditions a customer expects to encounter. Typically, a manufacturer may require a customer to specify pressure of feed gas and cell used, so that the power supply may be adjusted to work under the conditions anticipated.

In practical application, feed gas and component part conditions change and are unstable rendering preset parameters of an existing power supplies less than optimal. Consequently, the problem existing in the market is the lack of adaptability of conventional power supply designs to inherent variable conditions from cell design and its application. One may therefore expect, under real world conditions, a variable and unpredictable performance as conditions vary. The solution is to create a power supply that adapts to conditions in such a way that ozone production would be nearly independent of conditions such as temperature, pressure feed gas flow, and feed gas composition, and cell design.

Certain physical constraints as noted to control voltage, current, or frequency cannot by themselves or in known state-of-art combinations provide control independent of temperature, pressure feed gas flow and feed gas composition, and cell design.

The object of the present invention that has domesticated the unique challenge of managing electrical parameters so that any combination of cell design, pressure, flow, temperature in practice are addressed by the power supply. Voltage, current, and frequency are controlled by use of methods which unify the inherent variables into a manageable form, and that furthermore manage themselves in a simple, automatic fashion thus resolving the problem to optimize ozone production.

Because the use of electrical power in an electrical discharge cell necessarily requires AC power, we will limit ourselves to a discussion of AC power. We further limit our discussion to a situation in which a Power Supply provides power to a load device, which in this case may be considered to be an electrical discharge ozone generation cell.

For application of state-of-art ozone power supplies and ozone cells, a particular voltage and frequency is applied to a load device. The current will depend on the impedance of the device at the frequency being used. The impedance of the device being used will strongly depend on temperature, pressure, cell design and other physical characteristics.

The volt-ampere product [VA] in the cell will be greater than the power [W] dissipated in the cell. This is because there will be a phase difference between voltage and current. The effect of such a phase difference is that in a single cycle, some power will be returned to the power supply. The power that is returned to the power supply is sometimes termed "reactive power" [Q]. The relationship of VA, W, and Q is given by $VA^2=W^2+Q^2$. The quotient W/VA is often termed "power factor." In a practical electrical discharge ozone cell, power factor will be considerably less than unity. For purposes of clarity, and to prevent ambiguity, we will hereinafter use the term "rate of energy delivery" to describe the power W which is actually dissipated in the ozone cell and results in ozone formation.

As we have seen, there is an ineluctable relationship of voltage, current, frequency, temperature, pressure, frequency, and cell design that makes it impossible to control these factors independently of each other, as the interdependence is due to well-known physical law. Power factor will vary as conditions change as a further result. Thus, the rate of energy delivery cannot be determined by examination of VA. In summary, the designer of such a power supply is confronted by a multitude of interacting conditions. It is the nature of the ozone cell bound by physical laws that these conditions will vary substantially during actual use.

What is needed is a way to control power supply parameters so that its operation will adapt to changing conditions in a fashion that results in ozone cell performance that is relatively independent of temperature, pressure, feed gas, and cell design. In practice, it is not possible or practical for an end user to send his or her power supply to the factory for adjustment every time conditions change. The state-of-the-art power supply capability does not offer the end user a way to govern its parameters to control the rate of energy delivery. However, as we have seen, rate of energy delivery cannot be predicted by voltage, current or frequency.

It was the hypothesis of the inventor that the unifying parameter that needs to be precisely controlled is the rate of energy delivery. However, as we have seen, the rate of energy delivery cannot be predicted by voltage, current, or frequency.

It is the essence of the invention that the rate of energy delivery, with an appropriate design, may be held constant by control of a single parameter such as voltage, current, or frequency while allowing other parameters to vary according to the natural laws that govern the entire system of power supply, ozone cell and feed gas.

To do this requires that a parameter be chosen in the context of power supply and cell interaction that correlates to rate of energy delivery, even if the nature of the correlation will vary depending on conditions; that the rate of energy delivery itself be measured; and that the chosen parameter then be varied in a fashion that establishes a fixed level of energy delivery even though conditions may vary substantially in real world application.

Ozone Generation by Corona Discharge

FIG. 1 shows a system 100 for generation of ozone by corona discharge that comprises an AC high voltage power supply 102 and a corona ozone cell 104. The ozone cell 104 itself comprises a first electrode 106, a dielectric material 108, a second electrode 110, and a gap 112 formed between the dielectric material 108 and electrode 110. Diatomic Oxygen ($O_2$) is introduced to the gap 112, and an AC voltage is applied between the electrodes 106, 110 that is sufficient to produce a corona discharge in the gap 112. The discharge splits molecules of $O_2$, and some atoms recombine into ozone ($O_3$).

An ozone cell that relies on electrical discharge and a flow of oxygen containing gas is inherently an unstable electrical load. The power required is a function of temperature, and gas pressure and flow. The impedance of the cell is not constant, and impedance may decrease as the current increases. The capacitive component of the cell increases as the gap becomes conductive due to ionized gas. During normal electrical discharge ozone generation variables continuously change influencing the characteristics of the electrical load.

In order to compensate for the intrinsic change of an ozone cell during operation, it is necessary to control the output of the power supply. For example, one might attempt to control voltage. Use of voltage is not very satisfactory because the cell load varies with power, temperature, and pressure. In addition to causing changes in current, the power factor of applied power will vary, resulting in variable rate of energy delivery to the cell.

As another example, one might attempt to control current. Although controlling current would be more satisfactory than controlling voltage, controlling current is also deficient. For example, for some levels of current, there will be two distinct conditions possible, one with corona discharge and one without. Furthermore, as with voltage, variation of impedance will result in variation of voltage and power factor. Examination of current alone cannot predict ozone production.

Current and voltage at the cell will be out of phase with each other because of the capacitive nature of the cell. Not only does the cell gap define a parallel capacitor, the dielectric material, such as a dielectric plate, defines a series capacitor. Ionized gas increases electrical capacitance of the cell.

The product of voltage and current in a capacitor may be termed reactive power. Reactive power performs no net work on the load. When voltage and current are in phase, net work is performed on the load. In this case, the rate of energy delivery to the cell is positive.

We have observed that reactive power performs no net work on the load. It is known that recombining the atoms of $O_2$ as $O_3$ requires net expenditure of energy. Therefore, reactive power cannot contribute to this process. Only energy delivered to the cell can cause recombination of the atoms of $O_2$ into ozone. This is the essence of the heuristic reasoning behind the choice to regulate the rate of energy delivery to the cell, irrespective of voltage, current, and frequency.

Preferably, we would find and control a power supply parameter such that (1) ozone was a linear function of the parameter, and (2) for a given setting of the parameter, ozone production would be independent of temperature and pressure. A candidate for such a parameter is the rate of energy delivery to the cell. In practice, the rate of energy delivery is close to being an ideal parameter. However, its ability to predict ozone generation is limited, as are other known methods, by the well known decrease in half life of ozone as the temperature increases.

Even though holding the rate of energy delivery constant cannot entirely compensate for temperature since rate of recombination of $O_3$ increases with heat generated in the cell, we can hold power of the corona constant as conditions such as temperature, pressure, and flow vary.

An ozone power supply that controls the rate of energy delivery may comprise input of a power set point, measurement of the rate of energy delivered to the cell, calculation of the difference of set point and the rate of energy delivered to the cell (that difference hereinafter denoted "error") and processing of error such that it varies a parameter in the power supply in a fashion that reduces error. Suitable parameters include current, frequency, voltage, or some combination of the three. Although these parameters in themselves are not good predictors of ozone generation, they may be varied in a way to vary the rate of energy delivery.

Measurement of rate of energy delivery to the ozone cell may be accomplished by averaging the instantaneous (or infinitesimal) products of voltage and current at the cell, at the primary winding of the transformer, or at the output of the switching devices. A simpler way, in the case of an efficient design that operates from a fixed DC voltage, is to use average DC current as a measure of rate of energy delivery to the cell. If the power supply uses a fixed DC supply voltage and switching devices to generate AC voltage, and if those switching devices are efficient, the average DC current drawn can be used as a measure of AC power delivered. This method relies on the assumption of efficiency and conservation of energy.

Power delivered to the cell may be produced by switching power devices such as MOSFETs, insulated-gate bi-polar transistors (IGBTs), junction transistors, vacuum tubes or other electrical control devices. Control of voltage or current can be achieved by techniques well-known in the art. One method is pulse modulation in combination with series inductance. Another method is series impedance in combination with variable frequency, as is to be described in one of the preferred embodiments.

Figure 2:
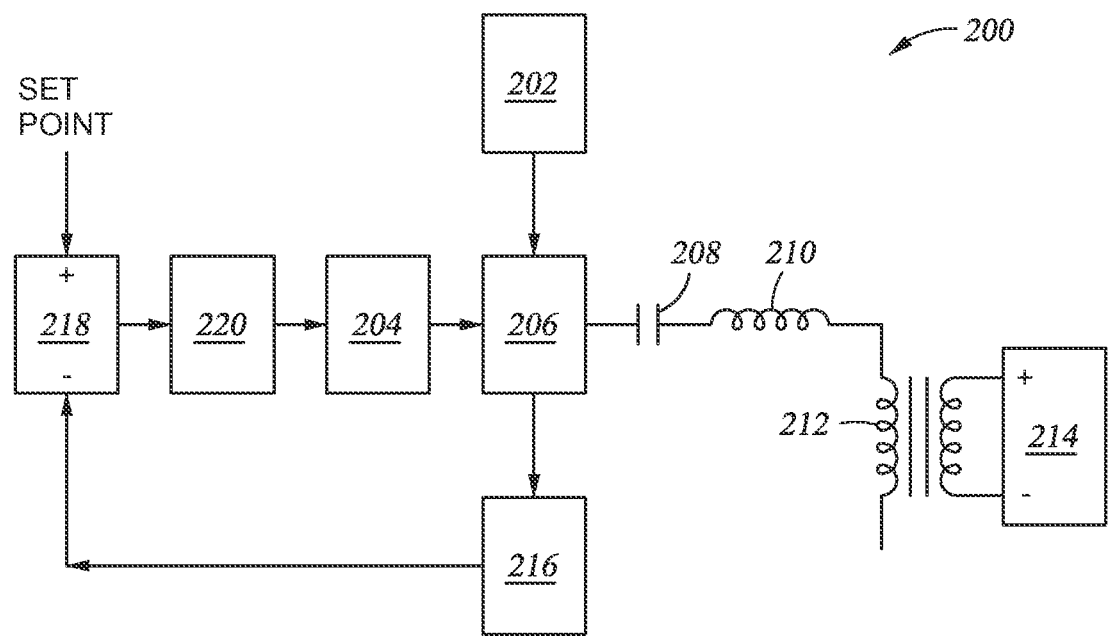
FIG. 2 is a schematic illustration of an ozone generation system according to another embodiment.

FIG. 2 shows an ozone generating system 200 according to another embodiment. In DC Power Supply 202, AC power is converted to a fixed, regulated DC voltage according to well-known means. For example, a boost type power factor correction system may be used. Voltage controlled oscillator 204 controls power to the switching devices 206. The action of switching devices 206 chops the DC voltage into a square wave. The output of switching devices 206 passes through capacitor 208 which blocks any DC component of the output.

The square wave voltage is applied to the first lead of inductor 210 whose second lead is applied to the primary of step up transformer 212. The secondary of the transformer is applied to the ozone cell 214.

Voltage and current in the primary of transformer 212 may be controlled by varying frequency of the voltage controlled oscillator 204. At high frequency, impedance of the inductor does not allow the passage of much current, so current, and therefore voltage, are held at a low value. As frequency is made lower, the inductance offers less impedance, so voltage and current tend to increase.

Voltage and current will increase to a maximum if the network comprising inductor 210 and transformer 212 resonates with electrical capacity of the cell. In this embodiment, frequency is restrained to be greater than or equal to resonant frequency.

Rate of energy delivery is measured in power measurement device 216. In this embodiment, the rate of energy delivery is represented by the average DC current supplied to the switching devices 206. Voltage need not be measured, because voltage is regulated to a fixed value. As a consequence, voltage may be considered to be a fixed, scaling quantity, not a variable. In this embodiment, input set point is a voltage. The difference of input voltage and power is derived in adder 218. That difference is applied to input of integrator 220. The output of integrator 220 controls frequency of voltage controlled oscillator 204. Voltage controlled oscillator 204 controls operation of switching devices 206. If power is greater than set point, the error will be integrated in a sense that increases frequency, decreasing delivered power. If power is less than set point, the error will be integrated in a sense that decreases frequency, increasing delivered power. In one embodiment, it is contemplated that the rate of energy delivery may be accomplished by averaging all of the instantaneous products of voltage and current over time.

In another embodiment, the functional components of the previous embodiment are the same, but certain parts are replaced by numerical techniques. In particular, variable frequency is produced by numerical techniques in a microprocessor. Power measurement is digitized by an analog to digital converter. Input setting is numerical, or it may be analog and then be converted to a digital form. The difference of setting and measured power is performed digitally. Their difference (i.e., error) is digitally integrated, and that number used in the routine that produces the variable frequency output to the switching devices.

In another embodiment, frequency is not the primary method of control of output. Instead, a pulse width modulation system is used in combination with a choke at the output. It will be recognized by those skilled in the art that this is similar to a class D audio amplifier.

It will be recognized by those skilled in the art that many other control systems would be possible without departing from the spirit of the invention.

Figure 3:
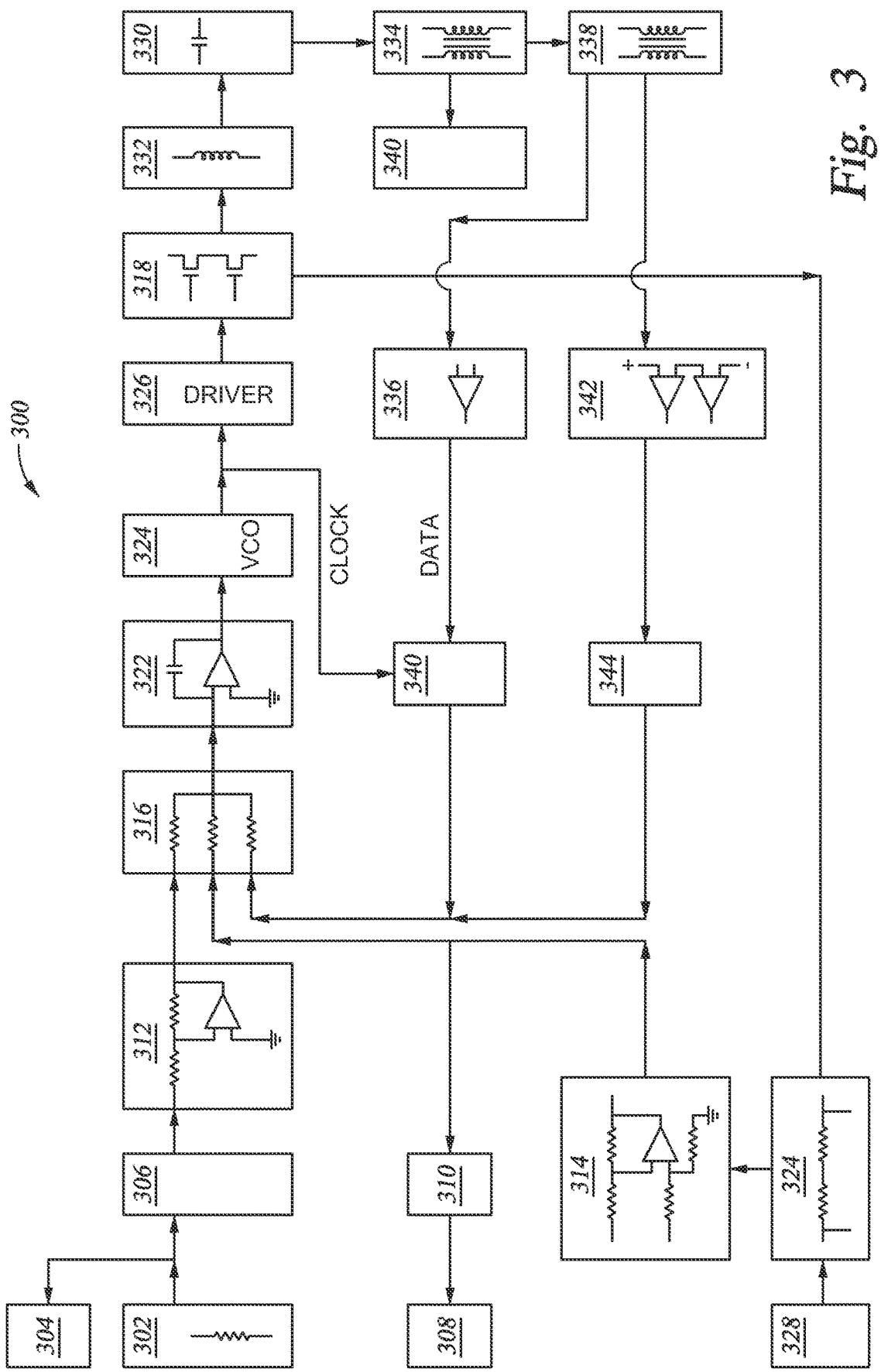
FIG. 3 is a schematic illustration of an ozone generation system according to another embodiment.

FIG. 3 is a schematic illustration of an ozone generation system 300 according to another embodiment. The system 300 includes a potentiometer 302 with a display 304 (e.g., a bar graph) of the power setting. The output of the potentiometer 302 passes through an electrical isolation system 306 for safety. The system 300 also includes a display of power 308 connected to an analog isolator 310, the input of which is the power measurement signal.

The control signal from the potentiometer 302 is inverted in an inverter 312 and then summed with the output of a differential amplifier 314 in an adder 316. The output of the differential amplifier 314 is a measure of the average DC current supplied to the power switching devices 318. Because DC voltage is constant and since the switching devices operate with high efficiency, the average current is an analog of the rate of energy delivery to the ozone cell.

By virtue of the inversion of control from the potentiometer 302, the output of the adder 316 (i.e., summing circuit) may normally be considered to be the difference between the control signal and the rate of energy delivery delivered to the cell 320. The difference may also be considered to be an error signal.

The error signal is integrated by an analog integrator 322 (i.e., time integral) whose output control frequency in a voltage controlled oscillator 324. It should be noted that use of an integrator here is just a special case of a Proportion Integral Derivative (PID) control loop. In this case, it is convenient and simplest to make the proportional and the derivative components to be zero, but they could be set differently without significantly affecting the operation. The output of the voltage controlled oscillator 324 controls a switching device drive circuit 326. The effect is that the DC power from the medium voltage supply 328 is converted into a square wave at the frequency of the voltage controlled oscillator 324 through a current sensing resistor. The DC component is removed by a series capacitor 330. The output also passes through a choke 332 and step-up transformer 334 whose output is applied to the ozone cell 320. In one embodiment, the switching device drive circuit 326 may comprise a MOSFET half-bridge drive circuit. In another embodiment, the switching device drive circuit 326 may comprise a MOSFET full-bridge drive circuit.

The ozone cell 320 presents a load with a large capacitive element. That is to say, current phase leads voltage phase. The reflected capacitance forms a resonant circuit in combination with the choke 332. Frequency of operation is kept above resonance.

As frequency decreases, power supplied to the ozone cell 320 increases, and correspondingly as frequency increases, applied power decreases. The aforementioned error changes the frequency of the voltage controlled oscillator 324 in a direction that tends to reduce error.

The input power to the switching devices 318 is a good estimate of the rate of energy delivered to the ozone cell 320. That is because the switching devices dissipate little power, capacitor 330 and choke 332 are reactive, therefore generating no heat, and transformer 334 is efficient. The only significant power dissipated within the cell is within the corona discharge in the cell 320. Power dissipated in the corona discharge is precisely the quantity we wish to control.

It should be noted that if frequency were to go lower than resonance, the negative feedback loop would become an unstable positive feedback loop, a possibility to be excluded. This case can be identified by looking at the relative phase of current and voltage. A comparator 336 connected to the current transformer 338 indicates sign of current on a continuous basis. When voltage goes positive, the state at that time is latched into the flip flop 340. If the output of the flip flop 340 goes high, indicating frequency at or below resonance, the integrator 322 is driven in a direction that increases frequency, preventing operation below resonant frequency.

Similarly, there is an over current detection consisting of a window comparator 342 and one shot multi-vibrator 344. If the current magnitude exceeds a set point, the integrator 322 is driven to a higher frequency for the duration of the one shot multi-vibrator 344 pulse.

Higher frequency decreases current because at higher frequencies (so long as we are operating above resonance) the impedance of the choke 332 is higher, and therefore also the impedance of the load presented to the switching devices 318 by the combination of choke 332, capacitor 330, transformer 334, and ozone cell 320.

It is to be understood that while the description has been made herein to use of an integrator, an integrator is only one embodiment of a PID feedback loop in which the proportional and derivative components are set to zero. The use of the integral component only was chosen for convenience, and other setting of a PID loop are contemplated.

By measuring the rate of energy delivered to the ozone cell, accurate control of ozone generation within the ozone cell can occur. In order to continually ensure the correct power is applied, the rate of energy delivered is measured and compared to the input setting. The frequency of the power is adjusted as needed to either decrease the power supplied to the ozone cell or increase the power supplied to the ozone cell.

While the foregoing is directed to embodiments of the present invention, other and further embodiments of the invention may be devised without departing from the basic scope thereof, and the scope thereof is determined by the claims that follow.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. For an ozone generation system having an ozone generation cell, a transformer having a high voltage output connected to the ozone generation cell for powering the ozone generation cell, and a power supply connected to an input of the transformer, the ozone generation system having a resonant frequency during operation, a method of operation comprising:
    driving current and voltage through the transformer and ozone generation cell at a driving frequency to control power delivered by the power supply to the ozone generation cell by the driving frequency;
    determining a phase relationship of current and voltage driven through the transformer and ozone generation cell; and
    in response to the determined phase relationship, restraining the driving frequency to a range more than the resonant frequency of the ozone generation system.

2. The method of claim 1 wherein the determined phase relationship has the current leading the voltage.

3. The method of claim 2 further comprising:
    receiving operating parameters of the power supply for a targeted rate of energy delivery to the ozone generation cell.

4. The method of claim 3 further comprising:
    measuring a rate of energy delivery to the ozone generation cell; and
    restraining the energy delivered by the power supply to the ozone generation cell to the targeted rate of energy delivery through a feedback loop of the measured rate of energy delivery.

5. The method of claim 4 wherein the step of restraining the rate of energy delivered to the ozone generation cell is responsive to the received operating parameters and the measured energy delivery rate.

\* \* \* \* \*